July 21, 1931.  H. P. LOVETT  1,815,789
LOOM CAM SHAFT BEARING LIFTER AND SUPPORTER
Filed Jan. 29, 1930
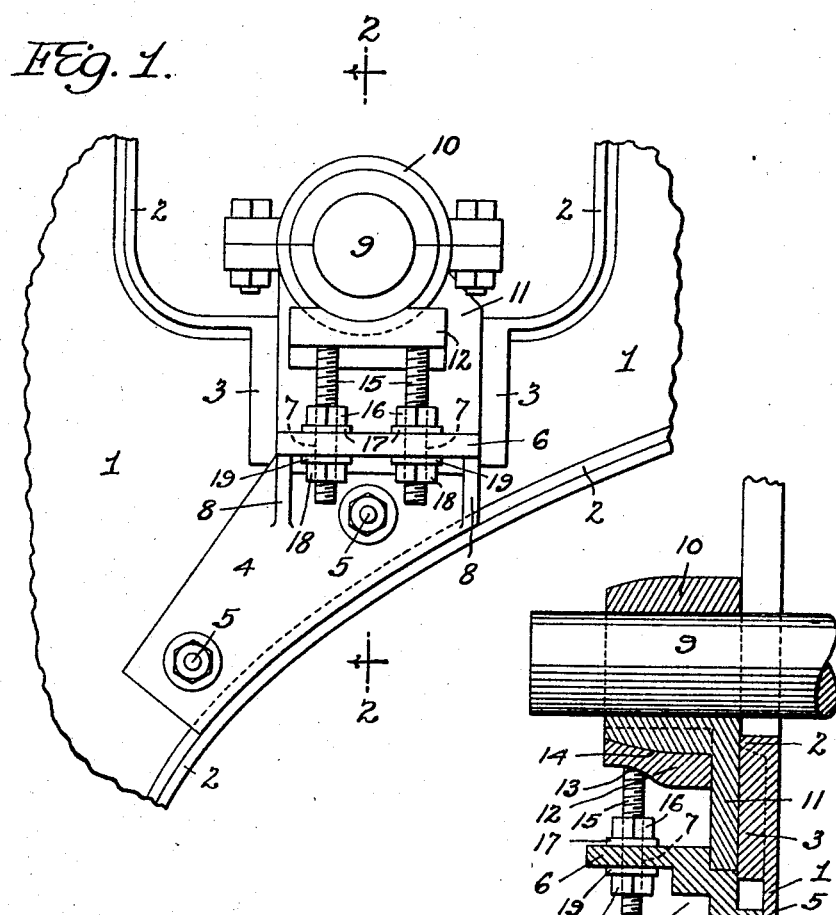
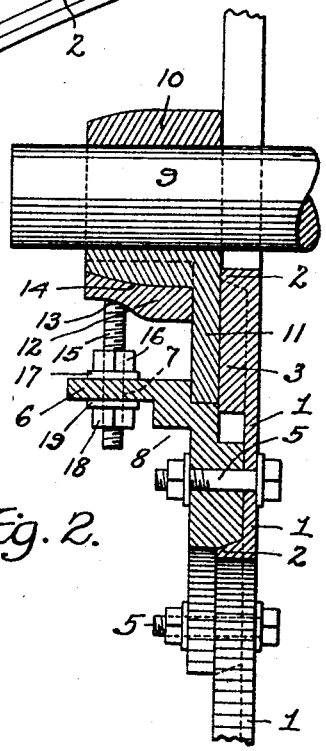
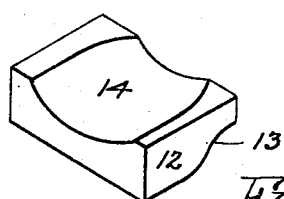
HOPSON PAUL LOVETT
INVENTOR
BY Victor J. Evans
ATTORNEY
WITNESS Lee Smith Patented July 21, 1931

1,815,789

UNITED STATES PATENT OFFICE

HOPSON P. LOVETT, OF COLUMBIA, SOUTH CAROLINA

LOOM CAM SHAFT BEARING LIFTER AND SUPPORTER

Application filed January 29, 1930. Serial No. 424,388.

This invention relates to a novel support for the bearings in which the cam shaft of a loom is mounted, the primary object of the invention being to provide a support whereby the bearing, supported thereby, may be elevated or lowered so as to effect proper action of the cams upon the cam shafts.

Another object of the invention is to provide an adjustable bearing support for the purpose stated so constructed that the adjustment of the head of the support, upon which the shaft bearing rests, may be effected with accuracy so as to insure of smooth and accurate rotation of the shaft and cams thereof.

It frequently happens that the gear upon the cam shaft does not mesh with the gear by which it is driven and the gears become broken, and therefore the invention has as a further object to provide a bearing for the cam shaft which will overcome this disadvantage.

This invention also consists in certain other features of construction and the combination and arrangement of the several parts to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a view in side elevation of the support embodying the invention mounted upon the frame of a loom and supporting one of the bearings of the cam shaft of the loom.

Figure 2 is a vertical transverse sectional view taken on the line 2—2 of Figure 1 looking in the direction indicated by the arrows.

Figure 3 is a perspective view, in detail, of the bearing-supporting head of the device.

In the drawings the numeral 1 indicates in general a portion of one of the sides of a loom frame which, as usual, is cast to provide outstanding flanges 2 at its margins and, at the point where the bearings for the cam shaft are to be mounted, being provided with vertical parallel guides 3. The device embodying the invention comprises an attaching base member 4, the lower edge of which is arcuate so as to rest upon the bottom flange 2 of the portion of the frame 1 against which the member is disposed. Bolts 5 being secured through openings in the said member 4. The member is provided with an outstanding portion 6 which is provided with bolt openings indicated by the numeral 7, these openings being arranged in spaced relation to each other, and on a line parallel to the side of the frame 1, and bracing webs 8 are formed integral with the outer side of the portion 4 of the attaching member, and with the under side of the supporting portion 6 thereof, at the ends of the said supporting portion.

The cam shaft of the loom is indicated by the numeral 9 and is mounted in the usual bearings which are indicated by the numeral 10 and, ordinarily these bearings are substantially of frusto-conoidal form, and are ordinarily provided with a downward extension 11, which engages against the side of the frame 1.

The supporting member of the device is best shown in Figure 3 of the drawings and comprises a cast head 12 which is of substantially rectangular marginal form and the under surface of which may be concaved as indicated by the numeral 13, the upper surface being formed with a seating recess indicated by the numeral 14 which is of the same contour, as the surface of the bearing 10, so that the bearing will seat snugly in the recess, and thus be supported free from vibration. The supporting member is provided upon its under side with two threaded stems 15 which may be secured in any suitable manner to the head or cast integral therewith and afterwards threaded, and these stems are fitted at their lower portions in the openings 7 in the outstanding supporting member 6 in the attaching member, and a nut 16 and washer 17 are fitted onto each of the stems to be adjusted to bear against the upper side of the portion 6 of the attaching member, and a similar nut 18 and washer 19 are fitted onto the lower end of each stem, and the nut is adjustable to cause the washer 19 to bear against the under side of the said portion 6. By reason of this construction, the nut 16 and washers 17 may, in removing the supporting member with the attaching member, be first threaded onto the stems and adjusted to an approximately correct position thereon, and the stems then fitted down through the openings and then after the bearing 10 has been disposed in the recess 14 in the head 12, the two nuts 16 may be adjusted until the head is precisely in a lever position whereupon the washer 19 and nuts 18 may be applied to the lower ends of the stems and tightened so as to secure the stems in place.

What I claim is:—

A device of the character set forth including a loom frame and bearings for the cam shaft of a loom, spaced guides on the frame, a base secured to the frame below the guides and extending between the latter and laterally offset to provide attaching portions, bearing supporting heads having recesses and snugly fitting portions of the bearings, threaded stems on the heads and extending through the attaching portions of the bases, and nuts threaded on the stems and engaging opposite faces of the attaching portions of the bases to permit adjustment of the bearings relative to the bases.

In testimony whereof I affix my signature.

HOPSON P. LOVETT.